O. H. NICKERSON.
OUTLET BOX CONNECTION.
APPLICATION FILED APR. 23, 1917.

1,358,774.

Patented Nov. 16, 1920.

Inventor,
Oris H. Nickerson.
By Hull, Smith, Brock & West
Attys.

UNITED STATES PATENT OFFICE.

ORIS H. NICKERSON, OF CLEVELAND, OHIO, ASSIGNOR TO THE ADAPTI COMPANY, OF CLEVELAND, OHIO, A CORPORATION OF OHIO.

OUTLET-BOX CONNECTION.

1,358,774. Specification of Letters Patent. Patented Nov. 16, 1920.

Application filed April 23, 1917. Serial No. 163,776.

*To all whom it may concern:*

Be it known that I, ORIS H. NICKERSON, a citizen of the United States, residing at Cleveland, in the county of Cuyahoga and State of Ohio, have invented a certain new and useful Improvement in Outlet-Box Connections, of which the following is a full, clear, and exact description, reference being had to the accompanying drawings.

This invention relates to an improved outlet box for use in the electric wiring of buildings, and it has for its object the economical production of a simple and efficient outlet box that is very convenient of installation, and which involves means for effectually clamping the ends of conduits within the box and which means is operable from the exterior of the box.

Figure 1:
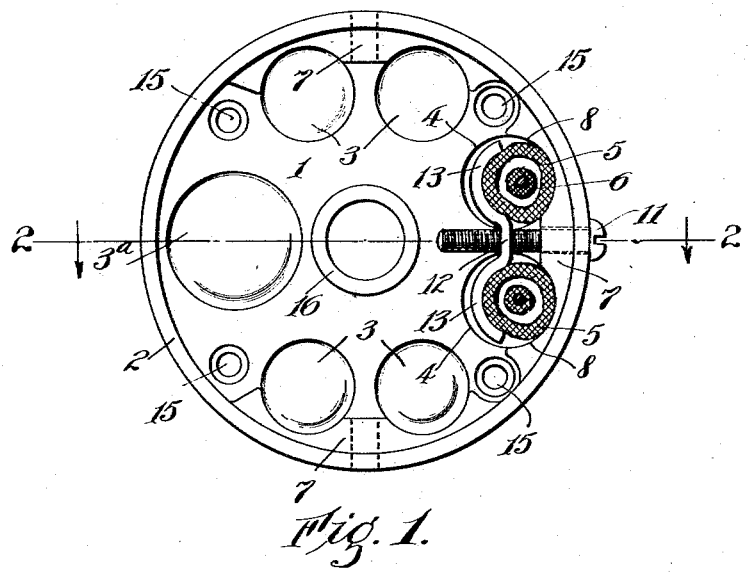
Figure 2:
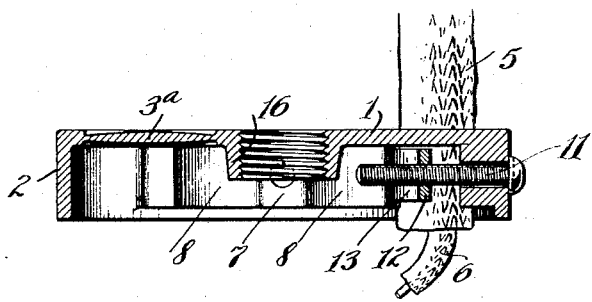
Figure 3:
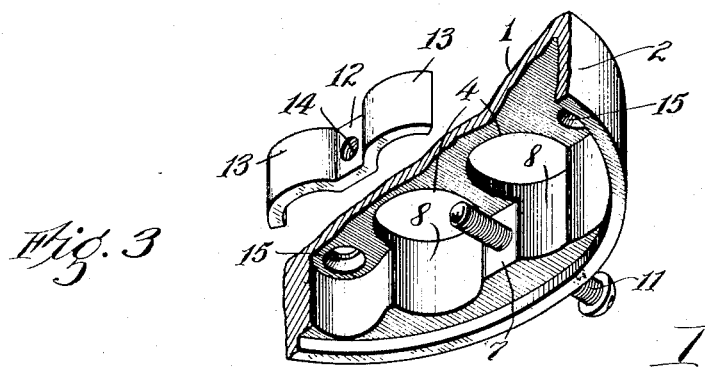

An embodiment of the invention is illustrated in the accompanying drawing wherein Figure 1 is a face view of the box showing the ends of two conduits clamped therein; Fig. 2 is a section on the line 2—2 of Fig. 1; and Fig. 3 is a fragmentary perspective view showing the conduit clamping elements in separated condition.

The box, in its present form, comprises a circular wall 1 and a shallow cylindrical wall 2, the former being provided with "knockouts" 3 which may be removed to produce conduit receiving apertures 4. To increase its range of utility, the circular wall of the box is further provided with a comparatively large "knockout" 3ª within which may be clamped the end of a pipe conduit where the nature of the work calls for such.

It will be observed that the "knockouts" 3 are arranged in pairs, so that by removing a pair, two openings are produced through which conduits 5 may be led carrying wires 6 representing, respectively, the positive and negative sides of an electrical circuit.

Enlargements 7 are formed on the inner side of the wall 2 and have curved conduit engaging surfaces 8 that are shown as flush with the adjacent edges of the conduit receiving apertures 4. For convenience, the enlargements 7 with their conduit engaging surfaces will be referred to hereinafter as "abutments." A bore 10 extends radially through the center of each abutment and through the wall 2; and a screw 11 passes freely through the bore. An element 12, having curved clamping end portions 13, is provided with a central threaded aperture 14 for the reception of the screw 11, so that by rotating the screw in an appropriate direction the element 12 may be drawn toward the abutment. The upper edge of the element 12 is in close proximity to the inner surface of the wall 1 so that the element is held against turning while the screw is being rotated.

The box may be secured to a ceiling or other supporting surface by nails or screws driven through the holes 15 in the wall 1. A threaded boss 16 depends from the center of the wall 1 for the connection and suspension of an electric light fixture.

After removing the desired number of "knockouts" and mounting a clamping element adjacent each pair of openings produced thereby, the box may be fastened in place and the ends of conduits led into the box alongside the abutments, after which the screw 11 may be turned from the exterior of the box to feed the clamping element toward the conduits thereby to clamp their ends firmly between the clamping portions of the element and the opposed abutments.

In the preferred embodiment of my invention, the box, with the "knockouts" and abutments, constitute an integral casting; and the clamping elements 13 are of sheet metal and have their apertures 14 tapped for the reception of the screws 11.

Having thus described my invention, what I claim is:—

An outlet box comprising walls at right angle to each other, one having an opening and the other having, on its interior, an abutment adjacent said opening, the wall having the abutment being provided with a hole, a clamping element opposed to said abutment, and means extending freely through the hole and having screw connection with and solely supporting the element for drawing the same toward the abutment, said means having a part for operating it disposed outside the box.

In testimony whereof, I hereunto affix my signature.

ORIS H. NICKERSON.